May 1, 1956 — G. A. LARSON — 2,743,557
ELECTRICALLY DRIVEN ABRADING DEVICES
Filed Jan. 10, 1951 — 4 Sheets-Sheet 1

Inventor
GEORGE A. LARSON
Andrew F. Wintercorn
Atty.

May 1, 1956 G. A. LARSON 2,743,557
ELECTRICALLY DRIVEN ABRADING DEVICES
Filed Jan. 10, 1951 4 Sheets-Sheet 2
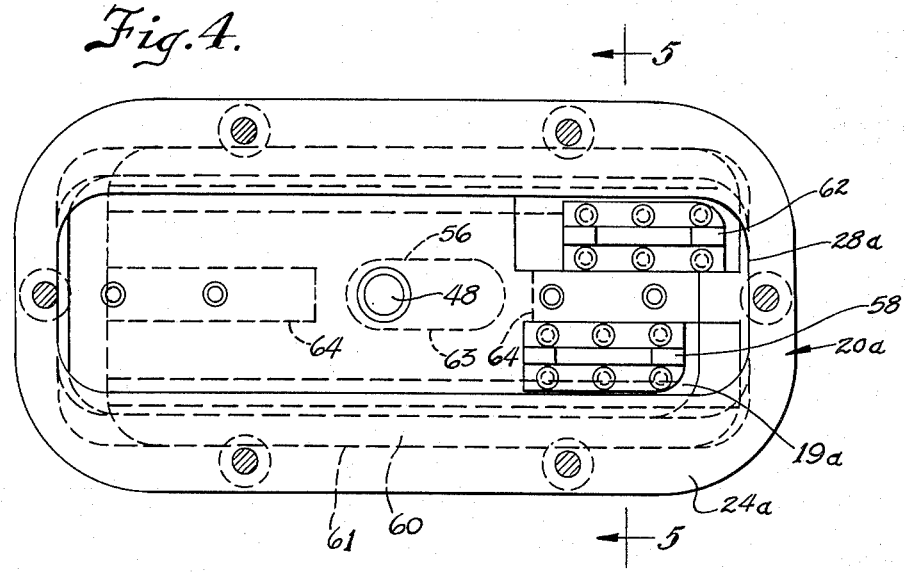
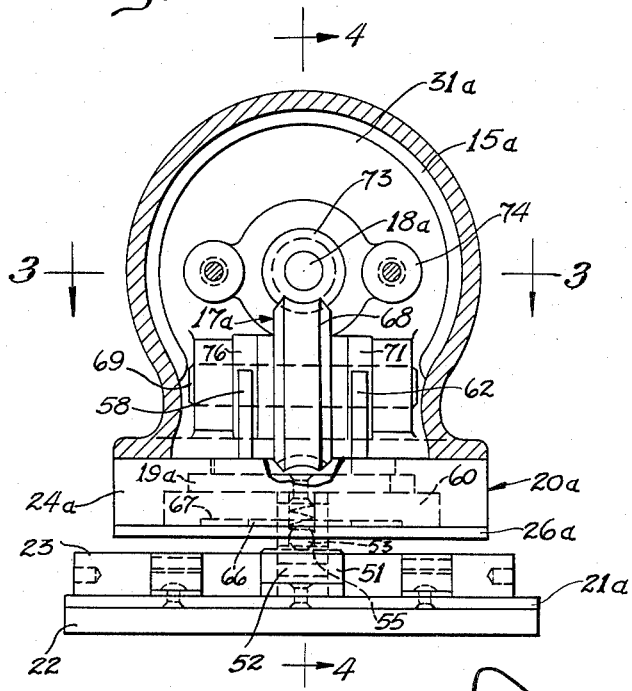
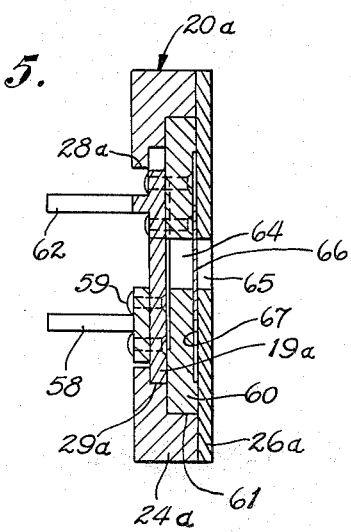
Inventor
GEORGE A. LARSON
Atty.

May 1, 1956 G. A. LARSON 2,743,557
ELECTRICALLY DRIVEN ABRADING DEVICES
Filed Jan. 10, 1951 4 Sheets-Sheet 3

Inventor
GEORGE A. LARSON
Atty.

May 1, 1956 G. A. LARSON 2,743,557
ELECTRICALLY DRIVEN ABRADING DEVICES
Filed Jan. 10, 1951 4 Sheets-Sheet 4
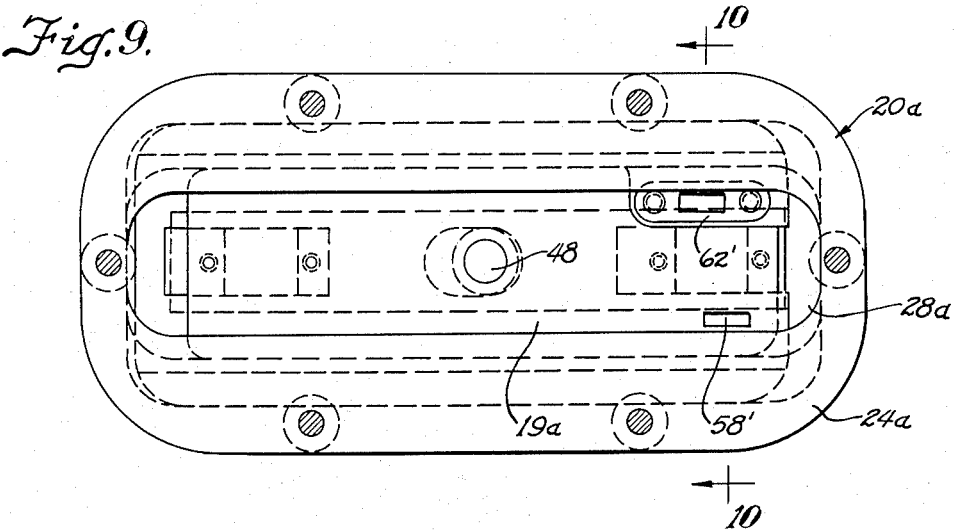
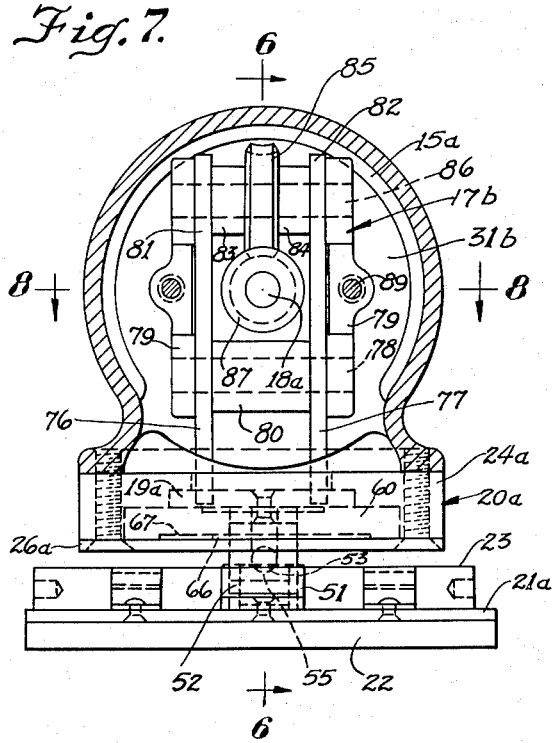
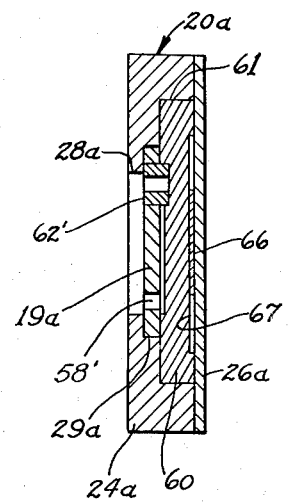
Inventor
GEORGE A. LARSON
Atty.

United States Patent Office 2,743,557
Patented May 1, 1956

2,743,557

ELECTRICALLY DRIVEN ABRADING DEVICES

George A. Larson, Rockford, Ill.; Alice R. Larson, executrix of said George A. Larson, deceased Application January 10, 1951, Serial No. 205,377

13 Claims. (Cl. 51—170)

This invention relates to electrically driven abrading devices such as sanders, rubbers, and/or polishers, and has for its principal object the provision of smoothly and quietly operating devices of this kind designed to be easily held by the operator in one hand as they are guided over the surface to be worked.

The reciprocatory movement transmitted to the abrading pad has a tendency to produce too much noise and also transmit vibration to the handle held by the operator, thus causing excessive wear and also too much fatigue for the operator when the device has to be operated for an hour or so at a time. It is, therefore, one of the principal objects of my invention to provide transmission gearing of improved design between the armature shaft of the motor and the abrading pad converting the rotary motion to reciprocatory motion in such a way as to reduce noise and vibration as well as wear, to a minimum. In this connection I also propose to provide either a counterweight or a second abrading pad holder arranged to be reciprocated with the pad but always in the opposite direction, so as to erase the tendency toward vibration by setting up a substantially equal and opposite reaction in the tool.

Sanders, due to the dust churned up in their operation, are notoriously difficult to lubricate properly. It is, therefore, another important object of my invention to provide an abrading device of improved design in which the reciprocable slide mechanism and the transmission gearing are both neatly enclosed for adequate lubrication.

The invention is illustrated in the accompanying drawings, in which:

Fig. 2 is a cross-section on the line 2—2 of Fig. 1;

Fig. 4 is a view taken on the line 4—4 of Fig. 1 showing the base and slide assembly;

Fig. 5 is a cross-section on the line 5—5 of Fig. 2;

Fig. 7 is a cross-section on the line 7—7 of Fig. 6;

Fig. 9 is a view taken on the line 9—9 of Fig. 6 showing the base and slide assembly, and Fig. 10 is a cross-section on the line 10—10 of Fig. 9.

Similar reference numerals are applied to corresponding parts throughout the views.

Figure 3:
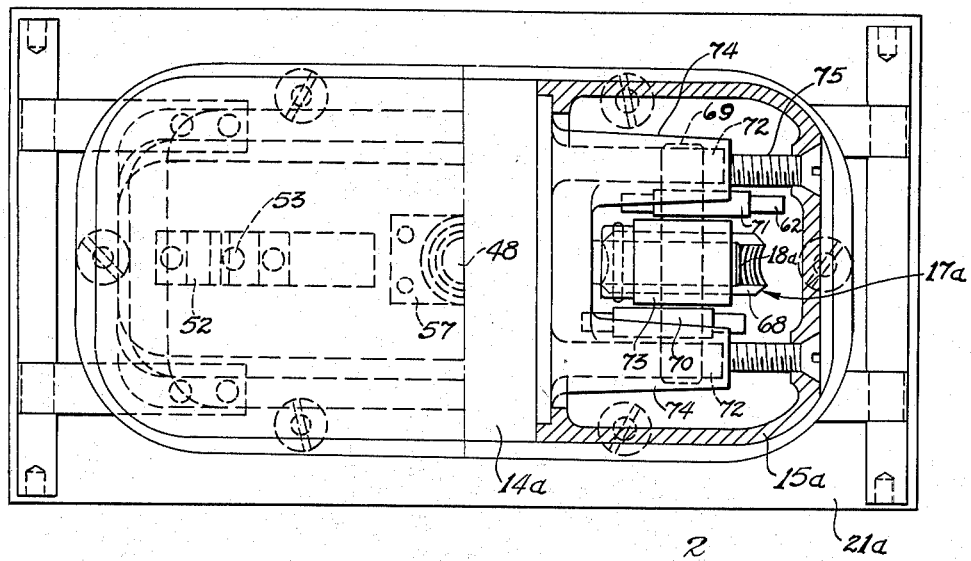
Fig. 3 is a plan view in which the pad drivers and locks are indicated in dotted lines in the left half, and the cover on the right half is cut away on the line 3—3 of Fig. 2.
Figure 1:
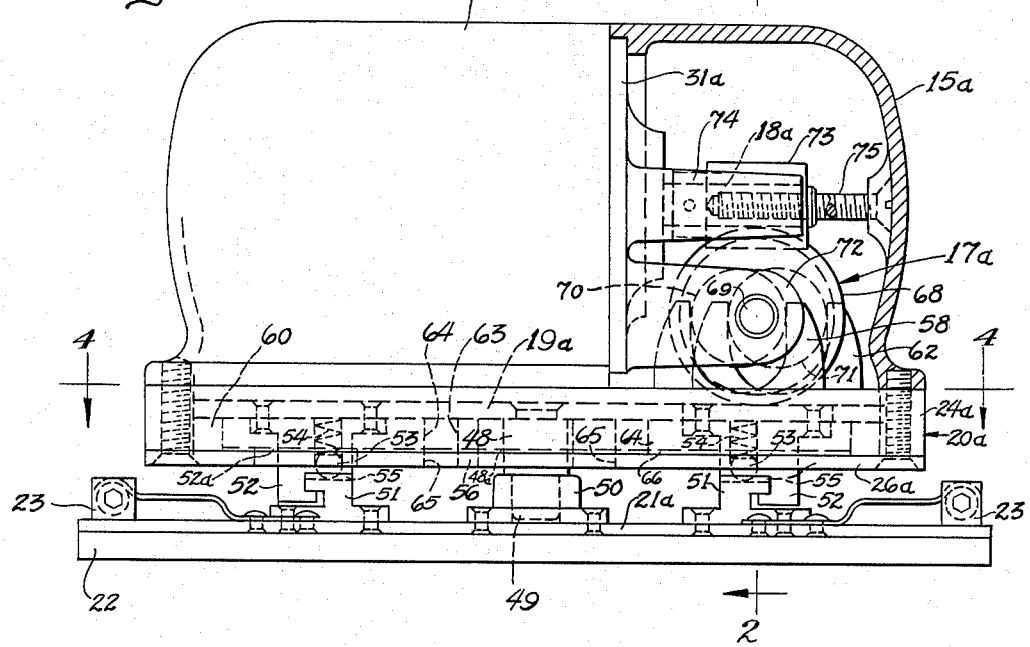
Fig. 1 is a view partly in side elevation and partly in longitudinal section on the line 1—1 of Fig. 2 showing an electrically driven sander made in accordance with my invention.
Figure 8:
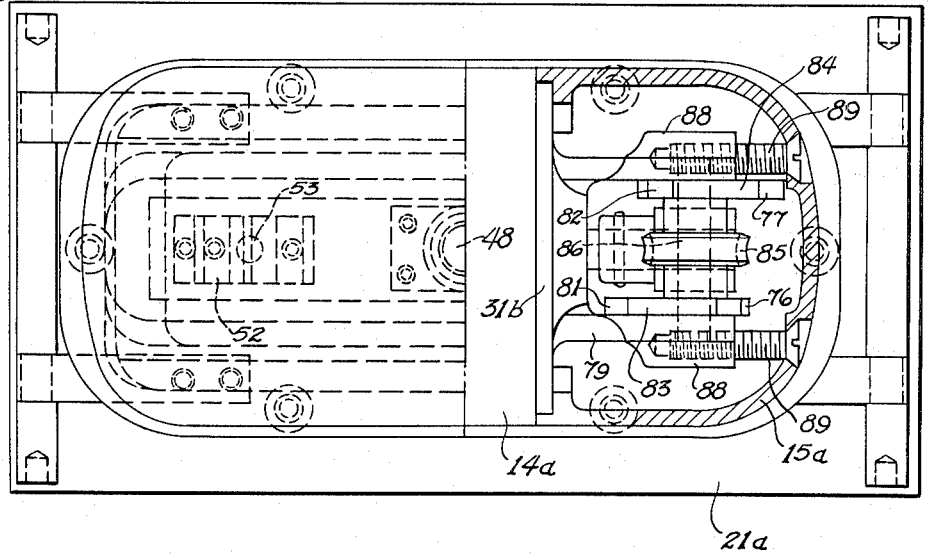
Fig. 8 is a plan view in which the pad drivers and locks are indicated in dotted lines in the left half, and the cover on the right half is cut away on the line 8—8 of Fig. 7.
Figure 6:
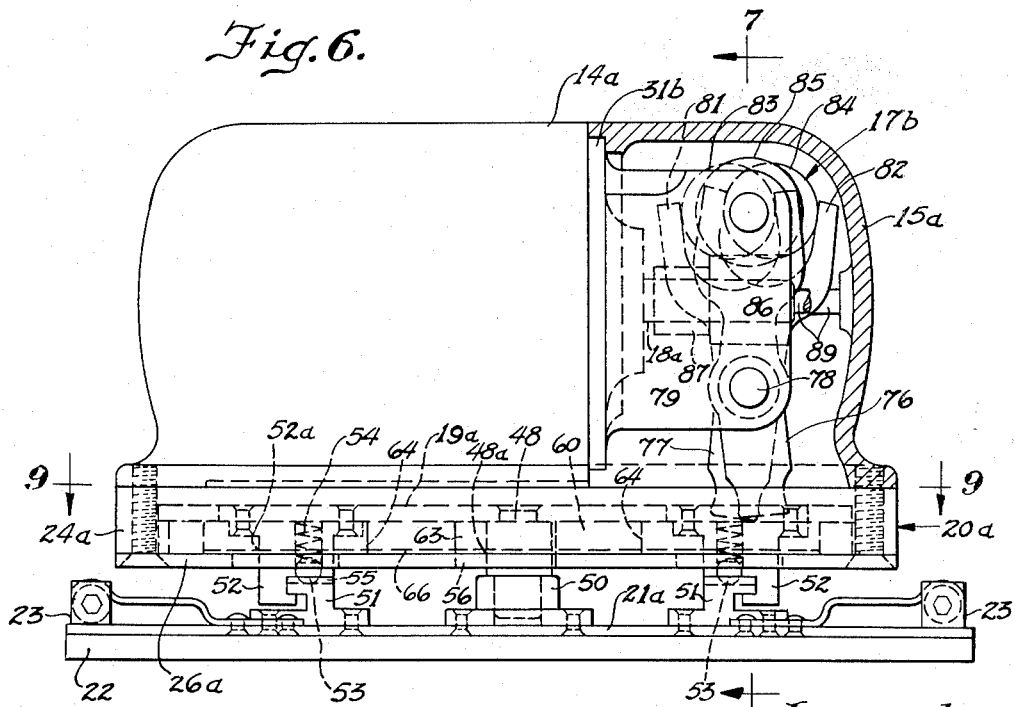
Fig. 6 is a view partly in side elevation and partly in longitudinal section on the line 6—6 of Fig. 7 showing an electrically driven sander of modified or alternative design.

Referring first to Figs. 1 to 5, the reference numeral 14a designates the housing of an electric motor which, like the end cover 15a, is substantially flat on the top and hollowed out on the sides, as indicated in Fig. 2, to facilitate the operator's holding the device and guiding it easily in its operation. The cover 15a lies substantially flush with the housing 14a and serves as an enclosure for the transmission mechanism or gearing indicated at 17a, provided between the armature shaft 18a of the motor and a slide 19a that is reciprocable in the base 20a and transmits reciprocatory motion to the pad-holder 21a. The latter, it will be understood, may be equipped with any suitable pad on the bottom, like the cushions indicated at 22 in Figs. 1 and 6, and also with any suitable clamping means on the top, like those indicated at 23 in Figs. 1 and 6, to hold the abrasive or polishing sheet material. The base 20a is made up of two plates, 24a and 26a, suitably secured together and to the housing 14a and cover 15a, as by means of screws. The plate 24a has an elongated opening 28a provided therein through which lubricant from inside the cover 15a is free to flow onto the slide 19a to the far end, the slide being guided for reciprocation in an elongated guide 29a provided in plate 24a. Plate 24a is operatively connected as by means of a center post 48 with the pad holder 21a. The post 48 has a reduced pivot portion 49 received in a bearing 50 provided therefor at the center of the pad-holder 21a, so that the pad-holder may be turned about the post 48 as a center to interlock the jaw portions 51, that are provided on the opposite end portions of the pad-holder, with mating jaws 52 provided on and projecting downwardly from the opposite end portions of the slide 19a, as clearly appears in Fig. 1. Detent balls 53, which are caged in the jaws 52 and extended to a limited extent by the action of coiled compression springs 54, are adapted to ride into depressions 55 provided on the tops of the jaws 51 when the pad-holder 21a is turned to a position in alignment with the base 20a, whereby to lock the pad-locker releasably in the attached position and thereby reciprocate it with the slide 19a. The plate 26a has an elongated opening 56 provided therein through which the post 48 projects for reciprocation with the slide 19a. A yoke 58, forming a part of the transmission gearing indicated at 17a, is riveted to the slide 19a, as indicated at 59, and extends upwardly into the cover 15a through an elongated opening 28a provided in the plate 24a. It will be evident that lubricant provided in the cover 15a has free access to all portions of the slide 19a through the opening 28a, thereby insuring good lubrication. However, motor 14a is shielded by end plate 31a from the lubricant, this plate also furnishing a bearing for the armature shaft 18a besides serving as a closure for the end of the motor housing inside the cover 15a.

A counterweight 60 which is in the form of a relatively thick rectangular plate, is guided for reciprocation in another guideway 61 provided in the plate 24a, wider than the guideway 29a. This counterweight has a yoke 62 attached thereto and arranged to transmit reciprocation thereto in timed relation with the reciprocation of the slide 19a and pad-holder 21a, but always in the opposite direction, whereby to offset any tendency for vibration by an equal and opposite reaction, thereby making for smoother operation of the tool and less likelihood of fatigue of the operator. The counterweight 60 has an elongated slot 63, which registers with the slot 56 in the bottom plate 26a and affords room for reciprocation of the post 48. Two other slots 64 are provided in the opposite end portions of the counterweight 60 for reciprocation therein of the jaws 52, and there are registering slots 65 provided in the bottom plate 26a, through which the jaws 52 project for reciprocation. A dust seal plate 66, having openings 48a and 52a through which the post 48 and jaws 52 project with a close fit, so that the plate 66 will reciprocate with the slide 19a, is received in a recess 67 provided in the bottom of the counterweight 60 and serves to prevent ingress of dust and grit through the openings 56 and 65 provided in the bottom plate 26a. It is apparent, therefore, that while I have provided a counterweight to erase the tendency for vibration due to reciprocation of the pad, this has been done in such a way as not to complicate the construction of the tool and interfere with good lubrication and good enclosure of the reciprocating slide 19a. While I have shown a counterweight it will be evident that the same effect is obtained if a second pad holder is so operated in timed relation but in the reverse direction to the other pad holder, two-shoe abrading machines for sanding, rubbing and/or polishing being well known.

The transmission gearing 17a consists of a worm gear 68 suitably fixed on a shaft 69 with two eccentrics 70 and 71 disposed on opposite sides of the worm gear and operating in the yokes 58 and 62, respectively. The shaft 69 is received in bearings 72 which extend from the closure plate 31a provided in the end of the motor housing 14a. A worm 73, suitably fixed on the projecting end of the armature shaft 18a, meshes with the worm gear 68 to transmit drive to the eccentrics 70 and 71, and, inasmuch as the latter are in 180° opposed relation, as clearly appears in Figs. 1 and 3, it is evident that the yokes 58 and 62 are always moved in opposite directions, so as to reciprocate the pad-holder 21a and counterweight 60 simultaneously but always in opposition to one another. The gearing 17a, being disposed inside the cover 15a, is, of course, well lubricated, being bathed in the lubricant provided in that space. Bosses 74 provided on the plate 31a have threaded holes in which screws 75 are received for fastening the cover 15a in place.

The device illustrated in Figs. 6 to 10 is substantially identical to that shown in Figs. 1 to 5 with the exception of the transmission gearing 17b. All of the other parts have accordingly been numbered the same as in Figs. 1 to 5, in so far as such numbering was applicable. The slide 19a connected to reciprocate the pad-holder 21a, instead of having a yoke 58 thereon, as in Fig. 5, has a slot 58' in which the reduced end of a rocker arm 76, forming a part of the transmission gearing 17b, is entered for reciprocation of the slide in the oscillation of the rocker arm. The counterweight 60 in like manner, instead of having a yoke 62 thereon, as in Fig. 5, has a slotted plate 62' riveted thereto, and another rocker arm 77 has a reduced end portion entered in the slot in this plate to transmit reciprocatory motion to the counterweight in the oscillation of the rocker arm, and, here again, the movement of the counterweight is always in the opposite direction with respect to the slide 19a and pad-holder 21a so as to erase the tendency for vibration by a substantially equal and opposite reaction. The two rocker arms 76 and 77 are pivoted on a cross-pin 78 which has a drive fit in holes provided therefor in parallel walls 79 formed integral with the end closure plate 31b of the motor housing 14a, a spacer 80 being provided between the arms on the cross-pin, as clearly appears in Fig. 7. The upper ends of the rocker arms 76—77 are forked, as indicated at 81 and 82, for cooperation with eccentrics 83 and 84, respectively, which are in fixed relation to opposite sides of a worm gear 85 that is mounted for rotation on a cross-pin 86 that is also carried in holes in the walls 79 with a drive fit, like the pin 78. A worm 87, suitably fixed on the end of the armature shaft 18a, meshes with the worm gear 85 to drive the cams 83 and 84 in unison, and, inasmuch as these cams are offset 180° with respect to one another, as clearly indicated in Figs. 6 and 8, it is evident that the rocker arms 76 and 77 are oscillated in unison but always in opposite directions. The location of the transmission gearing 17b inside the cover 15a, in which an adequate supply of semi-fluid lubricant is placed when the sander is assembled, insures good lubrication of all of the working parts, in addition to the sliding parts operated by the rocker arms. Bosses 88 are formed on the walls 79 and have threaded holes provided therein to receive screws 89 for fastening the cover 15a in place.

It is believed the foregoing description conveys a good understanding of the objects and advantages of my invention. The appended claims have been drawn to cover all legitimate modifications and adaptations.

I claim:

1. In an abrading device, a prime mover including a housing and a rotary drive shaft extending therefrom, an elongated base upon one portion of which said housing is carried in sealed relationship thereto, transmission gearing over another portion of said base drivingly connected with said shaft, a cover providing a chamber for said transmission gearing in sealed relation to the aforesaid housing and base, a slide reciprocable in a guideway provided in said base, means drivingly connecting said slide with said transmission gearing for reciprocation, a second slide with which the first mentioned slide is in superposed abutting relation reciprocable in another guideway provided in said base below the first-mentioned guideway, means drivingly connecting said second slide with said transmission gearing for reciprocation in timed relation to said first mentioned slide but in the opposite direction, and abrading pad holder means disposed in spaced relation to and below said base and rigidly connected with one of said slides for reciprocation therewith, the other of said slides functioning merely as a counterweight in relation to the pad-holder operating slide to reduce vibration.

2. In an abrading device, a prime mover including a housing and a rotary drive shaft extending therefrom, an elongated base upon one portion of which said housing is carried in sealed relationship thereto, transmission gearing over another portion of said base drivingly connected with said shaft, a cover providing a chamber for said transmission gearing in sealed relation to the aforesaid housing and base, a slide reciprocable in a guideway provided in said base, means drivingly connecting said slide with said transmission gearing for reciprocation, a second slide with which the first mentioned slide is in superposed abutting relation reciprocable in another guideway provided in said base below the first-mentioned guideway, means drivingly connecting said second slide with said transmission gearing for reciprocation in timed relation to said first mentioned slide but in the opposite direction, said base having an enlarged opening provided therein through which the means drivingly connecting said slides with said gearing extends for connection with said gearing, said opening establishing communication between the transmission chamber and said guideways for joint lubrication of the transmission gearing and slides, said slides together constituting movable closures for said opening, and abrading pad holder means disposed in spaced relation to and below said base and rigidly connected with one of said slides for reciprocation therewith, the other of said slides functioning merely as a counterweight in relation to the pad-holder operating slide to reduce vibration.

3. In an abrading device, a prime mover including a housing and a rotary drive shaft extending therefrom, an elongated base upon one portion of which said housing is carried in sealed relationship thereto, transmission gearing over another portion of said base drivingly connected with said shaft, a cover providing a chamber for said transmission gearing in sealed relation to the aforesaid housing and base, a slide reciprocable in a guideway provided in said base, means drivingly connecting said slide with said transmission gearing for reciprocation, a second slide with which the first mentioned slide is in superposed abutting relation reciprocable in another guideway provided in said base below the first-mentioned guideway, means drivingly connecting said second slide with said transmission gearing for reciprocation in timed relation to said first mentioned slide but in the opposite direction, said first-mentioned slide functioning as a counterweight in relation to the second-mentioned slide to reduce vibration, said base having elongated openings provided in the bottom thereof adapted for extension therethrough and reciprocation therein of members connected to said second-mentioned slide, abrading pad-holder means adapted to be reciprocated with the second-mentioned one of said slides and rigidly connected therewith by members extending through said openings and serving to space said pad holders means relative to said base, and a seal plate reciprocable with said slide and connecting members relative to said openings.

4. In an abrading device, a prime mover including a housing and a rotary drive shaft extending therefrom, an elongated base upon one portion of which said housing is carried in sealed relationship thereto, transmission gearing over another portion of said base drivingly connected with said shaft, a cover providing a chamber for said transmission gearing in sealed relation to the aforesaid housing and base, a slide reciprocable in a guideway provided in said base, means drivingly connecting said slide with said transmission gearing for reciprocation, said base having an opening provided in the top thereof establishing communication between the transmission chamber and said guideway for joint lubrication of the transmission gearing and slide, said base having elongated openings provided in the bottom thereof adapted for extension therethrough and reciprocation therein of members connected to said slide, and an abrading pad-holder adapted to be reciprocated with said slide and rigidly connected therewith by members extending through said openings and serving to space said pad holder relative to said base, the members connecting said pad holder with its operating slide including a pivot pin pivotally but detachably connecting the central portions of the pad holder and slide, and pairs of interlocking jaws at opposite ends of said slide and pad holder, each pair consisting of a jaw fixed to said slide and having a portion wherein a jaw fixed to said pad holder is detachably interlockable upon rotation of said pad holder about the pivot pin as a center.

5. An abrading device as set forth in claim 4 including spring pressed detent means for releasably securing the interlocked jaws in locked relationship.

6. In an abrading device, a prime mover including a housing and a rotary drive shaft extending therefrom, an elongated base upon one portion of which said housing is carried in sealed relationship thereto, a slide reciprocable in a guideway provided therefor in said base, an abrading pad holder rigidly connected with said slide for reciprocation therewith, and power transmission mechanism interconnecting the slide with said shaft for reciprocation in the rotation of said shaft comprising a cross-shaft mounted in transverse relation to said drive shaft between it and the slide and parallel to the latter, a worm fixed on the drive shaft meshing with a worm gear fixed on said cross-shaft, and an eccentric fixed in relation to said worm gear and operating in a yoke fixed on one end portion of said slide.

7. In an abrading device, a prime mover including a housing and a rotary drive shaft extending therefrom, an elongated base upon one portion of which said housing is carried in sealed relationship thereto, a slide reciprocable in a guideway provided therefor in said base, a sanding pad holder rigidly connected with said slide for reciprocation therewith, a second slide reciprocable in another guideway provided therefor in said base and adapted to be reciprocated in opposition to the first-mentioned slide to serve as a counterweight therefor, and power transmission mechanism interconnecting the slides with said shaft for reciprocation in opposite directions relative to one another in the rotation of said shaft comprising a cross-shaft mounted in transverse relation to said drive shaft between it and the slides and parallel to the latter, a worm fixed on the drive shaft meshing with a worm gear fixed on said cross-shaft, and a pair of eccentrics fixed in relation to said worm gear in 180° opposed relationship to one another and operating in yokes fixed to the one end portion of the respective slides.

8. In an abrading device, a prime mover including a housing and a rotary drive shaft extending therefrom, an elongated base upon one portion of which said housing is carried in sealed relationship thereto, a slide reciprocable in a guideway provided therefor in said base, an abrading pad holder rigidly connected with said slide for reciprocation therewith, a second slide in superposed abutting relation to the first mentioned slide and reciprocable in another guideway provided therefor in said base, and power transmission mechanism interconnecting the slides with said shaft for reciprocation in opposite directions relative to one another in the rotation of said shaft comprising a cross-shaft mounted in transverse relation to and above said drive shaft, a worm fixed on the drive shaft meshing with a worm gear fixed on said cross-shaft, a second cross-shaft mounted in parallel relationship to the first cross-shaft but between the drive shaft and the slide, and a pair of eccentrics fixed in relation to said worm gear in 180° opposed relationship to one another and operating in yokes on the ends of a pair of arms that are pivoted intermediate their ends on the second cross-shaft and pivotally connected at the other ends to the end portions of the respective slides.

9. In an abrading device, a prime mover including a housing and a rotary drive shaft extending therefrom, an elongated base upon one portion of which said housing is carried in sealed relationship thereto, a slide reciprocable in a guideway provided therefor in said base, an abrading pad holder rigidly connected with said slide for reciprocation therewith, power transmission mechanism interconnecting the slide with said shaft for reciprocation in the rotation of said shaft comprising a cross-shaft mounted in transverse relation to said drive shaft between it and the slide and parallel to the latter, a worm fixed on the drive shaft meshing with a worm gear fixed on said cross-shaft and an eccentric fixed in relation to said worm gear and operating in a yoke fixed on one end portion of said slide, and a cover providing a lubricant chamber therein for said power transmission mechanism, said base having an opening provided in the top thereof for supply of lubricant to the slide.

10. In an abrading device, a prime mover including a housing and a rotary drive shaft extending therefrom, an elongated base upon one portion of which said housing is carried in sealed relationship thereto, a slide reciprocable in a guideway provided therefor in said base, an abrading pad holder rigidly connected with said slide for reciprocation therewith, a second slide reciprocable in another guideway provided therefor in said base, power transmission mechanism interconnecting the slides with said shaft for reciprocation in opposite directions relative to one another in the rotation of said shaft comprising a cross-shaft mounted in transverse relation to said drive shaft between it and the slides and parallel to the latter, a worm fixed on the drive shaft meshing with a worm gear fixed on said cross-shaft, and a pair of eccentrics fixed in relation to said worm gear in 180° opposed relationship to one another and operating in yokes fixed to the one end portion of the respective slides, and a cover providing a lubricant chamber therein for said power transmission mechanism, said base having an opening provided in the top thereof for supply of lubricant to the slides.

11. In an abrading device, a prime mover including a housing and a rotary drive shaft extending therefrom, an elongated base upon one portion of which said housing is carried in sealed relationship thereto, a slide reciprocable in a guideway provided therefor in said base, an abrading pad holder rigidly connected with said slide for reciprocation therewith, a second slide in superposed abutting relation to the first mentioned slide and reciprocable in another guideway provided therefor in said base, power transmission mechanism interconnecting the slides with said shaft for reciprocation in opposite directions relative to one another in the rotation of said shaft comprising a cross-shaft mounted in transverse relation to and above said drive shaft, a worm fixed on the drive shaft meshing with a worm gear fixed on said cross-shaft, a second cross-shaft mounted in parallel relationship to the first cross-shaft but between the drive shaft and the slide, and a pair of eccentrics fixed in relation to said worm gear in 180° opposed relationship to one another and operating in yokes on the ends of a pair of arms that are pivoted intermediate their ends on the other cross-shaft and pivotally connected at the other ends to the end portions of the respective slides, and a cover providing a lubricant chamber therein for said power transmission mechanism, said base having an opening provided in the top thereof for supply of lubricant to the slides.

12. In an abrading device, a rotary drive shaft, a base upon which said drive shaft is carried, a slide reciprocable in a guideway provided in said base, means drivingly connecting said slide with said drive shaft for reciprocation, and an abrading pad-holder adapted to be reciprocated with said slide and rigidly connected therewith by members serving to space said pad-holder relative to said base, the members connecting said pad-holder with its operating slide including a pivot pin pivotally but detachably connecting the central portions of the pad-holder and slide, and pairs of interlocking jaws at opposite ends of said slide and pad-holder, each pair consisting of a jaw fixed to said slide and having a portion wherein a jaw fixed to said pad-holder is detachably interlockable upon rotation of said pad-holder about the pivot pin as a center.

13. An abrading device as set forth in claim 12, including spring pressed detent means for releasably securing the interlocked jaws in locked relationship.

References Cited in the file of this patent
UNITED STATES PATENTS

| | | |
|---|---|---|
| 1,519,530 | Chan | Dec. 16, 1924 |
| 1,553,456 | Metrakos | Sept. 15, 1925 |
| 1,761,059 | Van Norman et al. | June 3, 1930 |
| 1,957,790 | Mavis et al. | May 8, 1934 |
| 2,123,426 | Kehle | July 12, 1938 |
| 2,307,431 | Tilden et al. | Jan. 5, 1943 |
| 2,314,073 | Campbell | Mar. 16, 1943 |
| 2,328,613 | Burleigh | Sept. 7, 1943 |
| 2,345,383 | Curtis | Mar. 28, 1944 |
| 2,395,537 | Crosby | Feb. 26, 1946 |
| 2,437,152 | Burleigh | Mar. 2, 1948 |
| 2,493,226 | Cole | Jan. 3, 1950 |
| 2,526,976 | Smith | Oct. 24, 1950 |
| 2,582,470 | Walker et al. | Jan. 15, 1952 |